Aug. 19, 1958  M. L. BENJAMIN ET AL  2,848,239
FLOATING TOOL HOLDER
Filed Nov. 18, 1954
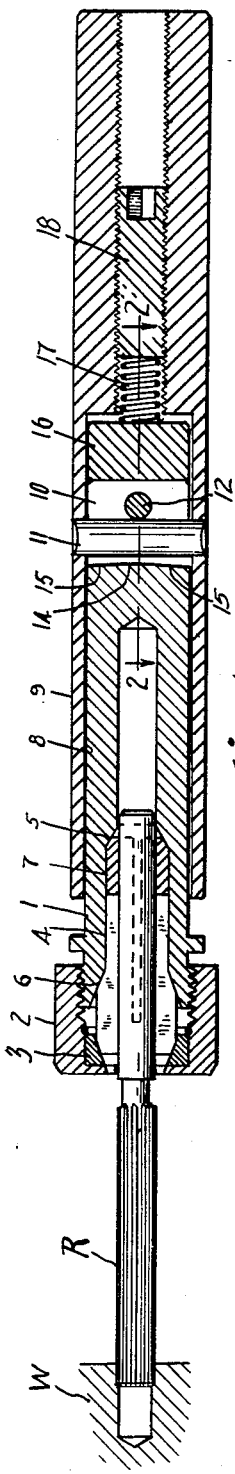
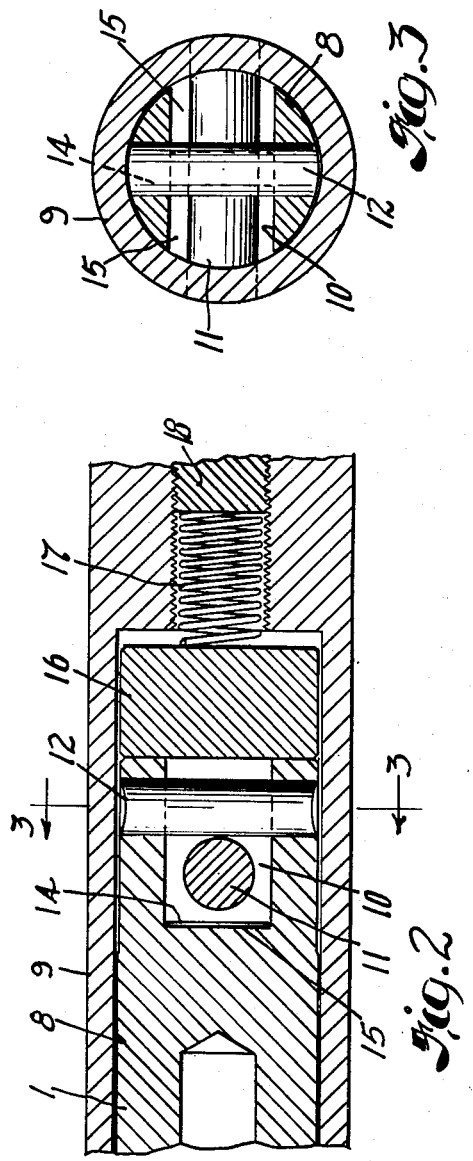
INVENTORS
MILTON L. BENJAMIN AND
BY STANLEY S. BENJAMIN.
Oberlin + Limbach
ATTORNEYS.

United States Patent Office 2,848,239
Patented Aug. 19, 1958

2,848,239

FLOATING TOOL HOLDER

Milton L. Benjamin and Stanley S. Benjamin, Cleveland, Ohio, assignors to Erickson Tool Company, a corporation of Ohio Application November 18, 1954, Serial No. 469,677

4 Claims. (Cl. 279—16)

The present invention relates generally as indicated to a floating tool holder which is capable of both parallel and angular floating or aligning movement with respect to its adaptor or mounting means.

In general, floating holders are employed in secondary machining operations where there is misalignment between the cutting tool and the machine spindle; and especially in reaming operations, the reamer should follow the previously drilled or bored hole and not be influenced by the spindle position. The floating holder accordingly maintains alignment of the reamer with the previously drilled or bored hole so as to avoid making of out-of-round, bell-mouth, and tapered holes.

In the case of horizontal turret lathes, for example, tools such as drills, boring bars, reamers, taps, etc. are mounted in horizontally extending positions on the turret stations for sequential axial feeding with respect to a rotating work piece or bar stock held in the lathe spindle, the reamer usually following the drill (or boring bar) as aforesaid. In actual practice, a drilled or bored hole in the work piece is never exactly coaxial with the reamer holder mount, and for this reason the holder should be capable of both angular and parallel float so that the reamer held thereby may guide itself into the previously drilled or bored hole.

Insofar as angular misalignment between the generally horizontal reamer and holder axis and the hole axis is concerned, it only requires a relatively small lateral force (upward, downward, or sideward) at the end of the reamer and holder assembly to angularly position the reamer for entrance into the hole about a universal pivot connection between the rear end of the tool holder and its turret mount. However, the provision for mere angular float of the holder is only a partial solution to the problem, because not only is there encountered the condition of parallel misalignment, but additionally the angular misalignment inevitably requires a lateral shifting (or parallel float) of the rear end of the holder, due to the fact that the hole axis and the holder pivot axis when angularly misaligned can only intersect at one relative axial position of the work piece and the reamer-holder assembly.

The provision of such "parallel float" of the reamer-holder assembly has usually been effected merely by lateral looseness between the holder and its mount, and this expedient has been more or less satisfactory when the holder is in vertical position. But when the holder is in horizontal position, this expedient is entirely unsatisfactory, because the lateral shifting of the reamer-holder assembly entails a lifting of the rear end of the assembly by means of a force couple applied at the end portion of the reamer. Obviously, when the reamer has entered the drilled hole only a short distance, the couple forces are tremendous in magnitude and result in the formation of a bell-mouth or tapered hole.

In order to make the foregoing point clear, let us assume that the reamer-holder assembly weighs only 1 lb. and is 6" long, having a center of gravity located 2" from the rear end of the holder. Such reamer and holder assembly can easily be lifted angularly simply by a ⅓ lb. upward force at the tip of the reamer, since such upward force acts through a 6" moment arm, whereas the 1 lb. weight of the assembly at the center of gravity acts only through a 2" moment arm.

Now suppose that it were attempted to raise the 1 lb. reamer and holder assembly upwardly by means of a force couple of ⅛" moment arm (reamer entered ⅛" into drilled hole) consisting of a downward force at the top of the reamer tip and an upward force at the bottom of the reamer ⅛" rearward from the tip thereof. Under such conditions, each of the couple forces would be approximately 100 times greater than the ⅓ lb. force aforesaid. Such huge forces at the tip of the reamer measurably reduce the life thereof and, in addition, the reamed holes would be out-of-round, tapered, and bell-mouthed.

With the foregoing in mind, it is a principal object of this invention to provide a floating tool holder in which the weight of the tool and its holder is entirely or partly counterbalanced at or adjacent the rear end of the holder end so as to render easy both the angular and parallel aligning movements of the tool, whereby tool life is substantially increased and uniform accuracy is achieved throughout the length of the hole in the case of a reamed hole.

It is another object of this invention to provide an axially yieldable tool holder which, during yielding thereof, permits the tool carried thereby to partake of its angular and parallel aligning movements.

It is another object of this invention to provide a floating tool holder in which the holder has limited axial yielding movement followed by positive axial thrust or stop means which has a line contact with the holder to thus render easy any further aligning movement, even after the holder abuts said axial stop means.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of a few of the various ways in which the principle of the invention may be employed.

In said annexed drawing:

Fig. 1 is a central longitudinal section view of a preferred embodiment of the present invention;

Fig. 2 is a fragmentary longitudinal section view, on somewhat enlarged scale, taken substantially along the plane 2—2, Fig. 1, at right angles to the plane of the Fig. 1 section; and Fig. 3 is a transverse cross-section view taken substantially along the line 3—3, Fig. 2.

Referring now more particularly to the drawing, the tool holder 1 is in the form of a cylindrical body threaded at its forward end for threaded engagement with a nose piece 2 having a nose ring 3 therein. The front end portion of said holder 1 is formed with a bore 4 coaxial therewith and including inner and outer coaxial and parallel frusto-conical surfaces 5 and 6 with which correspondingly frusto-conical faces of a contractible collet 7 are respectively engageable.

The frusto-conical outer end portion of said contractible collet 7 is engaged by a corresponding face in the nose ring 3. The collet 7 is tubular in form and is axially slotted from its opposite ends and is adapted to receive therein the shank of a reamer R or like tool. As evident, when the nose piece 2 is tightened, the collet 7 will be forced inwardly into the holder 1, and thus radially contracted into tight, gripping engagement with the shank of the reamer R or other tool. The specific form of chuck just described does not constitute any part of the present invention, and obviously any type of chuck structure will be found suitable.

Insofar as the novel features of the present invention are concerned, the tool R and holder 1 may be one and the same part. However, the specific type of collet chuck herein illustrated and described has been found ideally suited for the coaxial gripping of a tool R in the holder 1 because of the great length of the grip and uniformity in the contraction of collet 7 as effected by the widely spaced apart parallel cam faces 5 and 6 in said holder 1.

The rear end of the holder 1 is of cylindrical form, but not necessarily so, and fits in the bore 8 of a mounting means 9 with sufficient clearance to accommodate the maximum amount of angular and parallel misalignment which is encountered as in the drilling and reaming of holes in workpieces on a turret lathe or other machine. Of course, the diametral clearance will determine the amount of "parallel float," whereas "angular float" is determined not only by the clearance between the holder and the bore 8 of the mounting means 9, but also by the distance that the holder 1 telescopes into the bore 8. The mounting means 9 is adapted to be secured as in one of the turret stations of a turret lathe, whereby, as in the case of reaming of holes in work pieces, a drill mounted on one station will first drill the hole in the work piece and then, upon indexing of the turret head, the reamer will be brought into operative position and fed axially to ream the previously drilled hole.

The rear end of the holder 1 is formed with a slot 10 diametrically thereacross, which slot, as best shown in Fig. 2, loosely straddles a pin 11 anchored in the mounting means 9 and extending diametrically across the bore 8. Near the slotted end of said holder is a retainer pin 12 which is perpendicular to the slot 10 and to pin 11.

The bottom center of said slot 10 is provided with a relatively narrow flat surface or land 14 which is adapted to engage pin 11 in a line contact, and adjacent said land or flat 14 the bottom of said slot 10 is relieved as by the oppositely tapered surfaces 15; and thus, even when the land 14 engages the side of the pin, the holder 1 may partake of free angular aligning movement by rocking on said land and also free parallel aligning movement either lengthwise or crosswise of said pin.

Without such land 14 and reliefs 15, the use of a plane slot bottom would interfere with free angular float in a plane diametrically through the pin 11, and on the other hand the substitution of a sharp line or a convexly curved surface for the land 14 would result in a mere point contact between the line or curved surface and the side of pin 11 and consequent deformation, owing to great unit stress between the contacting points. My improved slot bottom affords a line contact without interference with free angular and parallel float.

Within the mounting means 9 and adjacent the rear end of the holder 1 is a cylindrical button 16 which also has radial clearance with the bore 8 and which is yieldably urged against the end of the holder by means of the coil spring 17 compressed between the button 16 and an adjusting screw 18 which is threaded into the mounting means 9 from the rear end of the latter. As is shown in the drawings, the spring pressure urges the button 16 and holder 1 forwardly with respect to the mounting means 9, whereby the pins 11 and 12 engage one another in a point contact which makes it easy to angularly align the holder 1 and tool R carried thereby. The spring pressure is preferably sufficient so that the friction between button 16 and holder 1 will support the weight of the holder 1 and tool R.

Now, as the tool R and work piece W are brought into engagement by relative axial feeding thereof (axial feeding of the holder and tool in the case of a turret lathe mounting), the tool can be easily swung in any plane when the chamfered tip thereof just starts to enter the drilled hole, and as the axial feeding continues, the necessary parallel aligning movement will also be easily accomplished without appreciable strain on the end of the tool and without reaming a tapered or bell-mouthed entrance in the hole.

Assuming that the holder 1 and tool R are in generally horizontal position, the holder shank will rest against the bottom of bore 8 and if the tool is relatively long and heavy, as is usually the case, the rear end of the holder shank will engage the top of bore 8; but, as was previously explained, even an upward swinging of the tip of the tool R can easily be effected about an axis at the point of contact between pins 11 and 12 or about an axis at the contact between flat 14 and pin 11 or while the holder 1 is yieldably moving toward the right.

In addition, the pressure of the square-ended spring 17 on button 16 to some measure tends to assist in such upward swinging from the horizontal or slightly downwardly inclined rest position of the holder-tool assembly. Of course, swinging in a horizontal plane presents no problem, because the weight of the holder-tool assembly is borne by the mounting means 9 and involves a rolling engagement between pins 11 and 12 or between pin 11 and land 14 or simply a slight tilting of the holder end surface and button 16.

With respect to "parallel float," the worst condition, as already described, is the attempted lifting of the rear end of the holder-tool assembly by means of a force couple at the forward end portion of the tool R, and this is virtually impossible except after the tool R has entered the drilled hole to some substantial depth, but in the meantime the hole entrance may be out-of-round, tapered, or bell-mouthed.

However, with our invention the weight of the holder-tool assembly is entirely or partly supported or counterbalanced by the effect of the spring 17 acting on the rear end of the holder; and, therefore, the force couple at the tool end will be negligible or at least a great deal less than when no counterbalancing influence is exerted.

This counterbalancing action of spring 17 (and button 16, if employed) can be readily understood by substituting for the coil spring 17, a straight spring wire (which it is proposed to do within the scope of the present invention) having one end anchored to screw 18 and the other end connected to the rear end of the holder 1. In such example, the rear end of the holder can only drop down an amount as permitted by the spring wire. With the rear end thus resiliently supported, the force couple required on the end of the tool to effect parallel movement will only be the small amount necessary to compensate for the reducing counterbalancing effect of the spring wire on the holder end as said spring approaches its normal straight, unstressed condition.

The holder 1 may rotate slightly in the mounting means until opposite corners of the slot 11 engage opposite sides of the cross pin 11, and thus a positive driving is assured or, in the case of turret lathes, a non-rotatable mounting of the tool R and holder 1 while the work piece W rotates with respect thereto. As a thrust force is applied on the tool R and transmitted through the holder 1, the spring 17 will be compressed further until the flat 14 at the bottom of the slot 10 engages the pin 11 and then, if not before, the tool R and holder 1 may partake of parallel and angular aligning movement to position the tool R coaxially with the drilled hole in the work piece W.

Because the tool-holder assembly is supported or counterbalanced by the spring 17, a relatively small force couple at the end of the tool is all that is necessary in order to produce the parallel aligning movement as compared with prior holders which do not include any such counterbalancing means. With the tool and holder thus coaxially disposed with respect to the axis of rotation of the work piece and drilled hole therein, the reaming operation progresses accurately and uniformly.

Although the foregoing description relates primarily to a holder 1 for a reamer 2, it is to be understood that the holder 1 may be employed in connection with the other tools and will have the same attributes, insofar as parallel and angular float and positive drive are concerned, irrespective of the particular nature of the tool. Also, as aforesaid, the tool and holder may be one and the same, provided that the slotting and drilling of the shank end of the tool can be economically accomplished. In the particular embodiment of the invention herein disclosed, the pin 11 is preferably made so as to be removable, and in this way different holders 1 with different collets 7 therein may be readily substituted in the single mounting means 9.

Other modes of applying the principle of the invention may be employed, change being made as regards the details described, provided the features stated in any of the following claims, or the equivalent of such, be employed.

We therefore particularly point out and distinctly claim as our invention:

1. In combination, a tubular mount; a tool holder having one end loosely telescoped within said mount for limited angular and transverse movements therein; said holder being formed with an axially extending slot transversely through such one end; a cylindrical stop pin secured in said holder to extend transversely across such slot in axially spaced relation to the bottom of such slot; a cylindrical drive pin secured in said mount to extend loosely through such slot in crosswise relation to said stop pin and loosely between the latter and the bottom of such slot whereby said mount and holder are held together against axial separation by engagement of said pins with each other; said drive pin being engaged by the sides and bottom of such slot to prevent rotation and axial movement of said holder relative to said mount by imposition of torque and axial thrust load on said holder while the looseness permits limited relative rotary, pivotal, axial, and transverse movements to accommodate angular and transverse misalignment of said mount and holder when a tool held by the latter is in operating position; and spring means effective, when said mount and holder are disposed in generally horizontal position, to support at least a portion of the weight of said holder to facilitate transverse lifting thereof by a force couple applied at the end of such tool.

2. The combination of claim 1 wherein said spring means comprises a coil spring axially compressed between said mount and holder, the resistance of said spring to lateral deformation serving thus to support at least a portion of the weight of said tool holder.

3. The combination of claim 1 wherein the bottom of such slot is formed to provide a relatively narrow land at its middle that has a line contact with said drive pin when there is thrust load on said holder and when the longitudinal axes of said mount and holder are coincident or parallel.

4. The combination of claim 3 wherein the bottom of such slot adjacent such land is tapered on opposite sides of such land so that said holder may partake of angular aligning movement by rocking on said land.

References Cited in the file of this patent

UNITED STATES PATENTS

| | | |
|---|---|---|
| 1,903,576 | Skeel et al. | Apr. 11, 1933 |
| 2,188,205 | Osborne | Jan. 23, 1940 |
| 2,475,385 | Frisco | July 5, 1949 |
| 2,475,386 | Frisco | July 5, 1949 |